United States Patent [19]

Sear

[11] 4,245,939
[45] Jan. 20, 1981

[54] METHOD AND APPARATUS FOR MACHINING SPHERICAL COMBUSTION CHAMBERS

[75] Inventor: Leonard Sear, Lake Orian, Mich.

[73] Assignee: F. Jos. Lamb Company, Warren, Mich.

[21] Appl. No.: 969,164

[22] Filed: Dec. 13, 1978

[51] Int. Cl.³ .............................................. B23C 3/34
[52] U.S. Cl. .................... 409/191; 409/199; 409/200
[58] Field of Search .................. 90/11 C, 15 R, 15 A; 409/186, 191, 199, 200; 407/42, 53

[56] References Cited

U.S. PATENT DOCUMENTS

| Re. 15,707 | 12/1922 | Jolls | 409/199 X |
|---|---|---|---|
| 2,367,221 | 1/1945 | Kraus | 407/42 X |
| 2,728,268 | 12/1955 | Clifton et al. | 409/186 |
| 3,584,534 | 6/1971 | Hougen | 90/15 R |
| 3,716,900 | 2/1973 | Erkfritz | 407/42 X |
| 3,773,665 | 5/1973 | Spriggs | 407/42 X |

Primary Examiner—Z. R. Bilinsky
Attorney, Agent, or Firm—Barnes, Kisselle, Raisch & Choate

[57] ABSTRACT

A spherically shaped combustion chamber is machined in the cylinder head of an internal combustion engine by revolving one or more cutting tools simultaneously about two axes; one axis being the central axis of the combustion chamber and the other axis being inclined thereto. The tools have a cutting point and a cutting edge extending from the cutting point. The tools are supported so that each cutting point passes through the axis of the combustion chamber, and, when each tool is located in its radially outermost position relative to the axis of the combustion chamber, the cutting edge of the tool cuts an annular surface around the periphery of the spherically shaped portion of the combustion chamber, which, at the bottom face of the cylinder head, corresponds in diameter to that of the cylinder bore.

1 Claim, 7 Drawing Figures

METHOD AND APPARATUS FOR MACHINING SPHERICAL COMBUSTION CHAMBERS

The compression ratio of an internal combustion engine is the ratio of the volumes of the cylinder when the piston is at bottom dead center and at top dead center. In modern internal combustion engines the volume of the cylinder when the piston is at top dead center is normally less than the volume of the combustion chamber in the cylinder head. The volume of the combustion chamber is decreased by that portion of the piston that extends into the combustion chamber. In order to meet the strict emission standards now required for internal combustion engines, the compression ratio must lie within very narrow limits established by the designer of the engine. Combustion chambers cannot be cast to the dimensional tolerances required to maintain the narrow limits now required. It is now necessary to machine the combustion chambers. Accordingly, chambers of irregular shape have been abandoned in favor of some geometrical shape that can be readily machined.

One form of combustion chamber now being used is a spherical segment, the cord length of which is approximately the same as the diameter of the cylinder bore. The problem that frequently arises when the spherical surface of the combustion chamber extends down to the bottom face of the cylinder head is that, in order to avoid interference between the spherical surface with the upper end of the piston and/or interference of the valves and the upper end of the piston, it frequently becomes necessary to increase the depth of the spherically shaped combustion chamber. However, if by such increased depth the circle defined by the combustion chamber at the bottom face of the head is larger than the piston bore in the cylinder block, this is undesirable for several reasons; perhaps the most significant disadvantage is that, since the cylinder bores are located close to one another, this enlarged diameter at the bottom face of the cylinder head appreciably reduces the gasket sealing surface of the cylinder head at the sections between adjacent cylinders. Accordingly, the desired diameter of the combustion chamber at the bottom face of the cylinder head is obtained by generating a geometrical cavity which is an axial extension on the spherical segment of the combustion chamber at the lower face of the head in the form of a shallow counterbore or frustum of a cone that has a diameter that is approximately equal to the diameter of the cylinder bore.

Experience has shown that such spherically shaped combustion chambers cannot be machined satisfactorily by plunging a partially spherically shaped cutter directly into the engine head to machine these chambers. The thin cast metal surrounding these combustion chambers does not have enough strength to withstand the resultant machining forces and will frequently collapse. Another objection to this method of machining spherically shaped combustion chambers is that the form cutters inherently will not produce a smooth surface finish which is desirable in a combustion chamber. This undesirable finish usually results from the unduly long length of the cutting edge of the form cutter in contact with the workpiece and also its near zero cutting speed at its axis of rotation.

The object of the present invention is to provide a method and apparatus which enables combustion chambers of this shape to be readily and accurately machined with a standard milling cutter in a manner such that one or more small cutting edges engage the workpiece with a high constant surface speed, thus insuring small forces and a good finish even at the central axis of the combustion chamber.

In accordance with this invention, a face milling cutter with a diameter approximately one-half the diameter of the cylinder bore is mounted with its axis of rotation at a substantial angle with respect to the central axis of the spherical combustion chamber to be machined. These two axes intersect at a point which is approximately at the center of the sphere. The milling cutter is journalled for rotation on a spindle that rotates on an axis aligned with the central axis of the spherical combustion chamber. The cutter is rotated about its own axis inclined to the spindle axis while the spindle is simultaneously rotated so that while the cutter is rotating about its own axis it is also revolved in an orbit concentric with the axis of the spindle. The cutting tools are mounted on the milling cutter body to accurately machine the spherical combustion chamber and simultaneously generate the desired annular extension surface. dr Further objects, features and advantages of the present invention will become apparent from the following description and accompanying drawings, in which:

Figure 1:
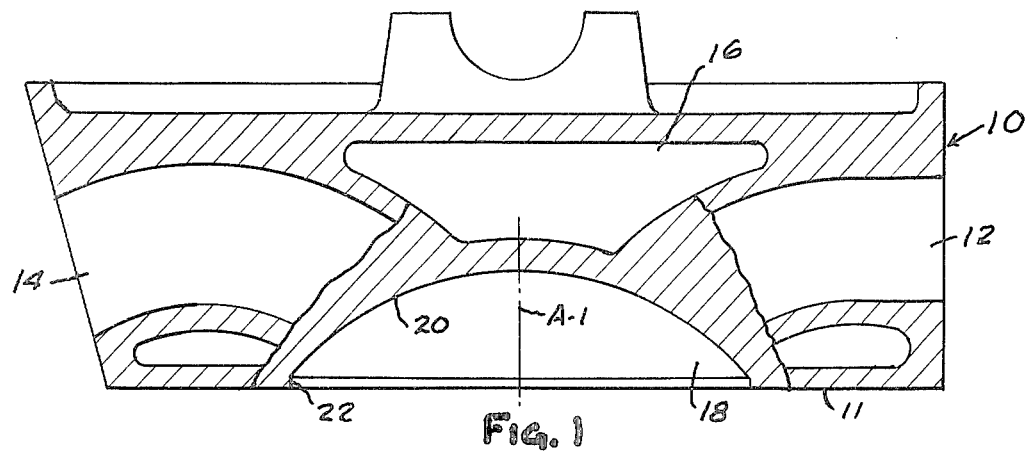
FIG. 1 is a fragmentary sectional view of a cylinder head showing the typical combustion chamber adapted to be machined in accordance with the present invention.

A typical cylinder head casting 10 shown in FIG. 1 has a bottom face 11, an inlet passage 12, an exhaust passage 14 and a water jacket 16. Passages 12, 14 are controlled by valves (not illustrated) and communicate with the combustion chamber 18 having a spherically shaped element 20 and a cylindrical counterbore 22, the diameter of which corresponds substantially with the diameter of the cylinder bore in the engine block. The depth of counterbore 22 is dictated by the desired volume of the combustion chamber and is provided to avoid the interferences previously referred to. Thus, the volume of combustion chamber 18 is determined by the volume defined by the spherical segment 20 and the cylindrical counterbore 22. In order to obtain the volume of the combustion chamber to the close limits required, it is essential to finish machine these surfaces as opposed to merely casting them.

Figure 2:
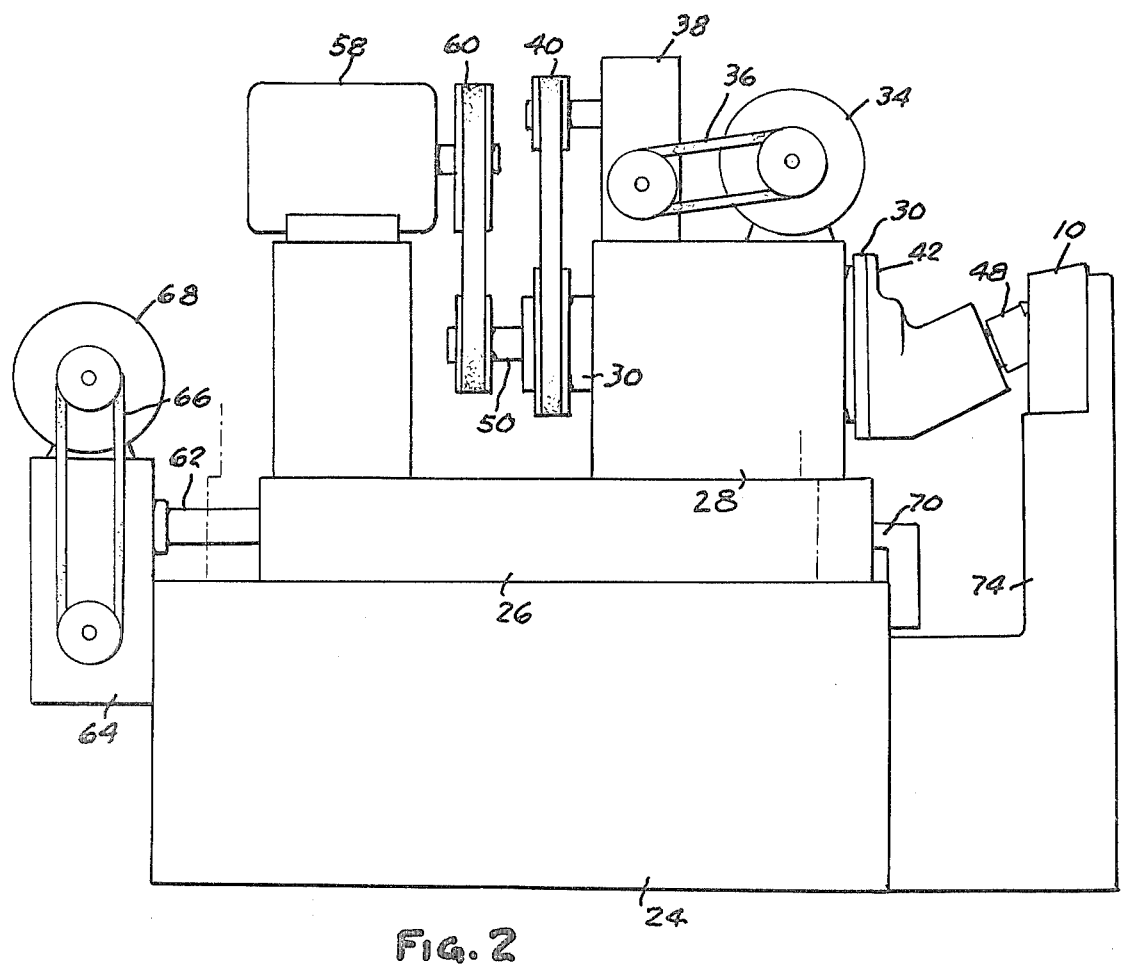
FIG. 2 is a side elevational view of a machine according to the present invention.
Figure 3:
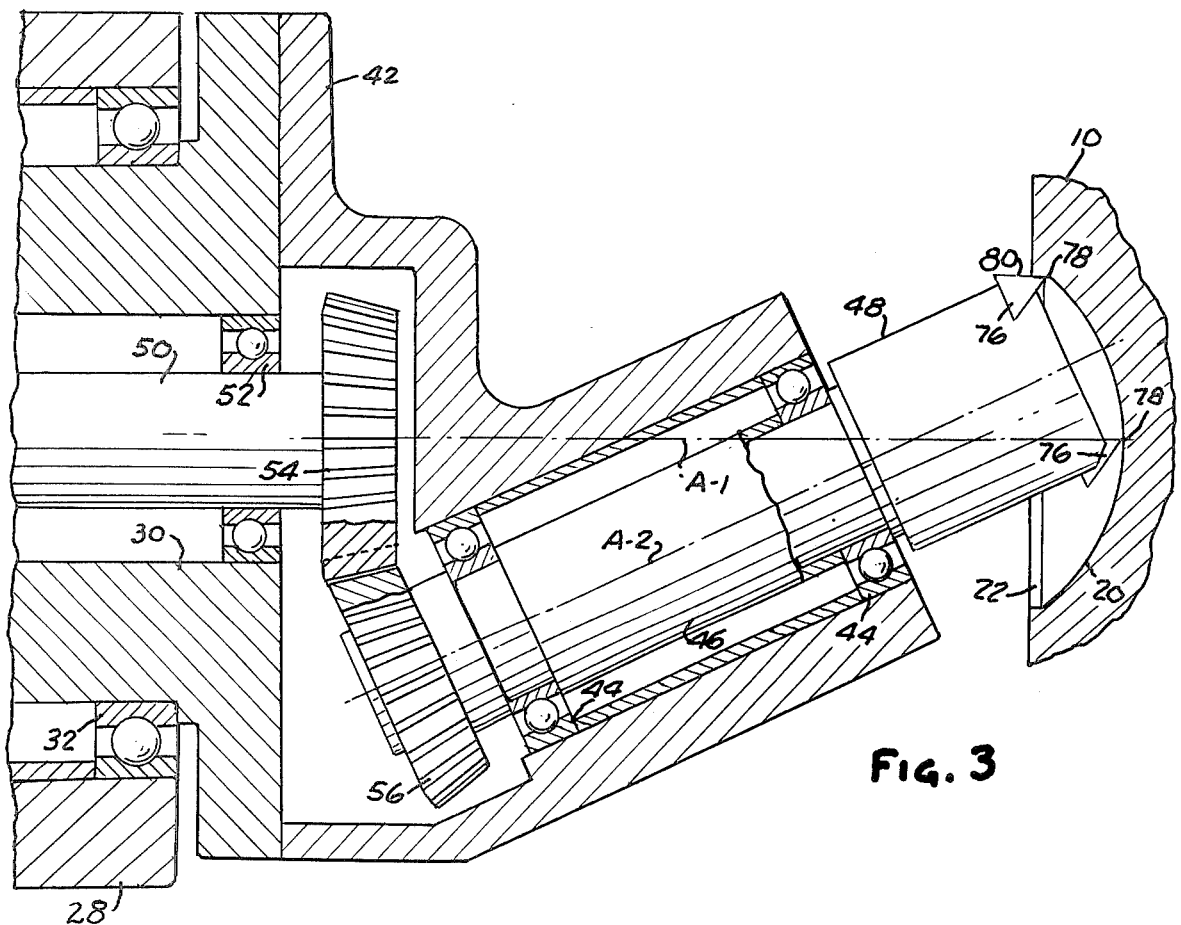
FIG. 3 is a fragmentary enlarged view of the cutting head of the machine.

The general arrangement of a machine according to the present invention is illustrated in FIGS. 2 and 3 and includes a base 24 which supports a slide 26. Within a spindle housing 28 supported on slide 26 a quill 30 is journalled by means of bearings 32. Quill 30 is rotated by means of an electric motor 34 having a belt drive 36 with a gear reducer 38 connected to the rear end of the quill by a belt drive 40.

On the forward end of quill 30 there is fixedly mounted a head 42. Within head 42 there is journalled, as by bearings 44, a shaft 46, the outer projecting end of which fixedly supports a milling cutter body 48. A shaft 50 is journalled coaxially within quill 30 by bearings 52. Shaft 50 drives the cutter shaft 46 through beveled gears 54,56. Shaft 50 is driven by a motor 58 mounted on slide 26 through a pulley and belt arrangement 60. The entire slide assembly is advanced and retracted by a feed screw 62 threaded into slide 26 and connected to a feed assembly 64 having a belt drive 66 with a motor 68. In the advanced position slide 26 abuts against a fixed stop 70 on base 24. The cylinder head 10 to be machined is mounted on a fixture 74, the fixture being designed such that the cylinder head is supported thereon so that the central axis A-1 of each spherically shaped combustion chamber 18 can be aligned coaxially with the axis of rotation of quill 30. The axis of rotation of shaft 46 and cutter body 48 is designated A-2.

In the embodiment illustrated the face milling cutter body 48 has two cutting tools 76 mounted thereon. Any number of cutting tools may be employed. Likewise, although the cutting tools 76 are shown having triangular shape, the cutting tools can be shaped other than triangularly. In FIG. 3 each cutting tool is shown with a sharp cutting point 78 and also a straight cutting edge 80 extending to the cutting point 78. It will be understood that in practice the cutting tool does not actually have a sharp point, but, rather, a radius that is specified on the drawing of the workpiece. Typically, the corner radius is about 1/32 of an inch. However, the calculations set forth hereinafter are based on a theoretical sharp corner of a triangular cutting tool. Small modifications are necessary to compensate for the actual tool corner radius. This difference can be compensated for by adjusting the tool angle and setting on the machine. Likewise, although the cutting edges 80 are shown straight, they could be arcuate or the tool could be circular as long as the portions generating the spherical segment 20 are relatively short. Thus, reference in the description and claims to the points or corners of the tool simply contemplates relatively short cutting edges contacting the workpiece. The cutting tools 76 are mounted on cutter body 48 so that in one position thereof the cutting point 78 passes through the axis A-1 and, when rotated through 180° from that position (that is, when the cutting tool is in its radially outermost position relative to axis A-1), the straight cutting edge 80 is substantially parallel to axis A-1 for producing a cylindrical counterbore 22 as shown in FIG. 3.

Figure 5:
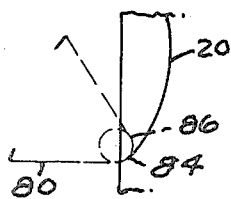
FIGS. 5, 6 and 7 illustrate additional cutting tool configurations and arrangements for producing annular extension surfaces of various shapes.
Figure 6:
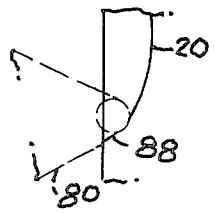
Figure 7:
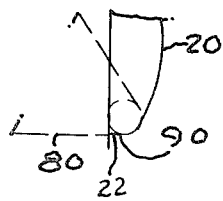

Other typical geometrical cutting tool shapes and their orientation on the cutter body 48 that determine the diameter of the combustion chamber and the shape of the axial extension of the spherical segment 20 thereof are shown in FIGS. 5, 6 and 7. In FIG. 5 the shape of the axial extension of the spherical segment 20 comprises a rounded shoulder 84, the radius of which is determined by the radius 86 at the corner of the tool. In FIG. 6 the axial extension of the spherical segment 20 comprises a conical frustum 88. The diameter of the combustion chamber is determined primarily by the inclination of the straight edge 80 of the tool relative to the axis of rotation of cutter body 48. FIG. 7 shows the counterbore 22 of FIG. 3 formed by the straight edge 80 of the tool arranged parallel to the axis A-1 and connected with the spherical segment 20 by a small radius 90 generated by the radius at the corner of the tool.

With respect to the specific arrangement shown in FIG. 3, in operation, quill 30 and its head 42 are rotated at a relatively slow speed, typically 6 or 7 rpm, about axis A-1 and shaft 46 and cutter body 48 are rotated relatively rapidly, typically about 2,000 rpm, about the axis A-2. As the rotating cutter body 48 revolves around axis A-1 the cutting points 78 will generate the spherical segment 20 of the combustion chamber and the straight edges 80 of the cutting tools 76 will machine the cylindrical counterbore 22. It will be realized, of course, that the general shape of the combustion chambers 18 will be cast in the cylinder head and the metal to be removed to form the finish machined combustion chamber will be relatively small. If desired, only shaft 46 and cutter body 48 may be rotated while the cutter assembly is being advanced into the workpiece to the desired depth as controlled by stop 70. The rotation of quill 30 may be initiated after the slide has been advanced to engage stop 70. On the other hand, both the quill 30 and the shaft 46 may be rotated when advancing and retracting the cutting tools. In any event, to machine the combustion chamber it is essential to rotate quill 30 at least slightly more than one revolution while the slide is engaged with stop 70 in order to completely machine the combustion chamber.

Figure 4:
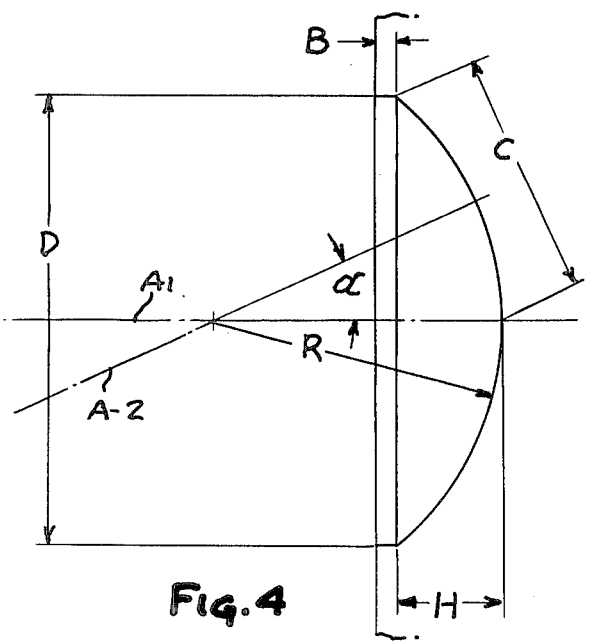
FIG. 4 is a diagrammatic view illustrating the parameters involved in machining a spherical combustion chamber according to the present invention.

As shown in FIG. 4, the axes A-1 and A-2 intersect at the center of the radius R of the spherically shaped combustion chamber. The various parameters for set up and machining the combustion chamber shown in FIG. 3 can readily be calculated by well-known trignometric functions. For example, the angle $\alpha$ between axes A-1 and A-2 is determined by the following equation:

$$\sin 2\alpha = \frac{D}{2R} \text{ OR}$$

$$\alpha = \tfrac{1}{2} \sin^{-1}\left(\frac{D}{2R}\right),$$

wherein D is the diameter of the counterbore 22 and R is the radius of the spherical segment 20. The cutter diameter C, that is, the diameter of the circle generated by the cutting tools 76, is determined by the following equation:

$$C = D/2 \cos \alpha$$

It will be understood, of course, that the total volume of the combustion chamber is the sum of the counterbore 22 and the volume of the spherical segment 20. The volume of the spherical segment 20 is determined by the equation:

$$V_s = (\pi/3)H^2(3R - H) \text{ OR}$$

$$V_s = (\pi/24)H(3D^2 + 4H^2),$$

wherein H is the height of the spherical portion, R is the radius of spherical segment 20, and D is the length of the spherical cord. The volume of counterbore 22 is determined by the equation:

$$V_c = (\pi D^2 B/4),$$

wherein B is the height of counterbore 22 and D is the diameter of the counterbore.

The required modifications to the above calculations for machining the combustion chambers shown in FIGS. 5, 6 and 7 and the corresponding changes in the tool angle, if any, and the machine settings will be readily apparent.

I claim:

1. Apparatus for machining spherically shaped combustion chambers in a cylinder head for an internal combustion engine comprising, a support, a rotatable shaft journalled on said support, a fixture for supporting a cylinder head with the central axis of the combustion chamber to be machined therein aligned co-axially with the axis of rotation of said shaft, a head on said shaft rotatable therewith, a cutter body projecting from said head and journalled thereon for rotation about an axis inclined to and intersecting the axis of rotation of said shaft, at least one cutting tool mounted on said body in a position offset radially from the axis of said body and having a corner cutting edge at the axially outermost end thereof which passes through the axis of rotation of shaft when the cutter body is rotated, means for independently rotating said cutter body and said shaft simultaneously about their respective axis, and means for relatively moving said support and fixture toward and away from each other along a path parallel to the axis of said shaft while the cutter body is rotating and the shaft is not rotating, said cutting tool also having a straight cutting edge thereon extending axially inwardly from said cutting corner on the radially outer side thereof and positioned on said body so that it extends parallel to the axis of the shaft when it rotates with said body to its radially outermost position relative to the axis of said shaft, whereby the rotating cutting body is fed into a cylinder head to a depth where the corner cutting edge of the cutting tool penetrates into the work throughout its path of revolution and said shaft is thereafter rotated simultaneously with the cutting body, the cutting tool cuts a spherically shaped combustion chamber having a circular cylindrical bore at the outer end thereof.

* * * * *